(12) United States Patent
Yuan

(10) Patent No.: US 12,523,716 B2
(45) Date of Patent: Jan. 13, 2026

(54) COMPENSATION CIRCUIT AND COMPENSATION METHOD FOR MAGNETIC FIELD SENSING ELEMENT

(71) Applicant: SUZHOU NOVOSENSE MICROELECTRONICS CO., LTD., Jiangsu (CN)

(72) Inventor: Fute Yuan, SIP Suzhou (CN)

(73) Assignee: SUZHOU NOVOSENSE MICROELECTRONICS CO., LTD., Sip Suzhou (CN)

( * ) Notice: Subject to any disclaimer, the term of this patent is extended or adjusted under 35 U.S.C. 154(b) by 159 days.

(21) Appl. No.: 18/700,759

(22) PCT Filed: Feb. 23, 2022

(86) PCT No.: PCT/CN2022/077380
§ 371 (c)(1),
(2) Date: Apr. 12, 2024

(87) PCT Pub. No.: WO2023/060817
PCT Pub. Date: Apr. 20, 2023

(65) Prior Publication Data
US 2024/0426949 A1     Dec. 26, 2024

(30) Foreign Application Priority Data
Oct. 13, 2021   (CN) .......................... 202111189830.X

(51) Int. Cl.
*G01R 33/00* (2006.01)
*G01R 33/07* (2006.01)

(52) U.S. Cl.
CPC .......... *G01R 33/0029* (2013.01); *G01R 33/07* (2013.01)

(58) Field of Classification Search
CPC ................ G01R 33/0029; G01R 33/07; G01R 33/0082; G01R 33/02; H10N 52/101
See application file for complete search history.

(56) References Cited

U.S. PATENT DOCUMENTS

| 6,362,618 B1 | 3/2002 | Motz |
| 8,723,515 B2 * | 5/2014 | Motz .................... G01R 33/072 |
| | | 324/207.2 |

(Continued)

FOREIGN PATENT DOCUMENTS

| CN | 203550968 U | 4/2014 |
| CN | 106772148 A | 5/2017 |

(Continued)

OTHER PUBLICATIONS

International Search Report for PCT/CN2022/077380 (PCT/ISA/210) mailed on Jul. 15, 2022.

*Primary Examiner* — Alvaro E Fortich
(74) *Attorney, Agent, or Firm* — Birch, Stewart, Kolasch & Birch, LLP

(57) ABSTRACT

Disclosed are a compensation circuit and compensation method for a magnetic field sensing element. The compensation circuit comprises a magnetic field sensing element, a reference resistor, a current source, and a processing module. The magnetic field sensing element comprises a sensing substrate, a sensing response layer, a sensing electrode, and a sensing doped region. An average current flows in a first plane. The reference resistor comprises a resistor substrate, a resistor response layer, a resistor electrode, and a resistor doped region. The average current at least partially flows in a direction of a first thickness. The direction of the first thickness is perpendicular to the first plane. The sensing response layer and the sensing doped region form a same doped structure as the resistor response layer and the resistor doped region. The compensation circuit provided in the (Continued)

present invention ensures the consistency of temperature and the stress sensitivity of compensation.

15 Claims, 9 Drawing Sheets

(56) References Cited

U.S. PATENT DOCUMENTS

| | | | |
|---|---|---|---|
| 2001/0050557 A1 | 12/2001 | Kempe | |
| 2014/0009221 A1* | 1/2014 | Motz | G01R 33/077 327/564 |
| 2016/0209480 A1* | 7/2016 | Hioka | G01R 33/075 |
| 2016/0245880 A1 | 8/2016 | Ausserlechner | |
| 2016/0299199 A1* | 10/2016 | Cesaretti | G01R 33/075 |
| 2016/0377690 A1 | 12/2016 | Huber et al. | |
| 2017/0261306 A1 | 9/2017 | Ausserlechner | |
| 2018/0321329 A1 | 11/2018 | Kosier et al. | |
| 2019/0049529 A1* | 2/2019 | Cesaretti | H10N 52/01 |
| 2019/0353717 A1 | 11/2019 | Motz | |

FOREIGN PATENT DOCUMENTS

| | | |
|---|---|---|
| CN | 106872914 A | 6/2017 |
| CN | 107356269 A | 11/2017 |
| CN | 107436416 A | 12/2017 |
| CN | 108535669 A | 9/2018 |
| CN | 109307850 A | 2/2019 |
| CN | 109708672 A | 5/2019 |
| CN | 110133543 A | 8/2019 |
| CN | 110501031 A | 11/2019 |
| CN | 112083211 A | 12/2020 |
| CN | 214251372 U | 9/2021 |
| CN | 113640713 A | 11/2021 |
| TW | 201719189 A | 6/2017 |
| WO | WO 2016/164260 A1 | 10/2016 |

* cited by examiner

COMPENSATION CIRCUIT AND COMPENSATION METHOD FOR MAGNETIC FIELD SENSING ELEMENT

CROSS-REFERENCE TO RELATED APPLICATION

This application claims priority to Chinese patent application No. 202111189830.X, entitled "COMPENSATION CIRCUIT AND COMPENSATION METHOD FOR MAGNETIC FIELD SENSING ELEMENT", filed on Oct. 13, 2021, the disclosure of which is hereby incorporated by reference in its entirety.

TECHNICAL FIELD

The present invention relates to the field of magnetic field sensing technologies, and in particular, to a compensation circuit and compensation method for a magnetic field sensing element.

BACKGROUND OF THE INVENTION

Magnetic field sensing elements are widely applied to daily life, industry, energy, among other fields. By sensing the current state of the magnetic field, functions such as orientation determination, contact opening and closing, and data measurement are implemented. However, due to process limitations, Hall semiconductor devices, which are mostly used for magnetic field sensing in general technology, are susceptible to physical parameters of the environment during operation, leading to errors beyond the allowable range in outputs. The physical parameters typically include mechanical stress. Two implementations are provided in the prior art to resolve the impact of mechanical stress on Hall semiconductor devices. In one implementation, two groups of Hall devices are configured in the same plane of a single substrate, and through the switching of the two groups of Hall devices in different current directions in the same plane, mean compensation is formed. In the other implementation, two groups of Hall devices with different doped structures are configured in the same plane of a single substrate, and through different doping, mean compensation is achieved. However, the foregoing technical solutions have the technical problems such as low sensitivity to stress and poor compensation effect due to the flow of the current in the same plane, mutual interference caused by the different current directions between the two groups of Hall devices on the same substrate, poor consistency of temperature due to different doped structures, and/or the like.

SUMMARY OF THE INVENTION

One of the objectives of the present invention is to provide a compensation circuit for a magnetic field sensing element, so as to resolve technical problems such as low sensitivity to stress, poor compensation effect, mutual interference of current, poor consistency of temperature, and/or the like in the prior art.

One of the objectives of the present invention is to provide a compensation method for a magnetic field sensing element.

To achieve one of the foregoing objectives of the present invention, an embodiment of the present invention provides a compensation circuit for a magnetic field sensing element, comprising: at least one magnetic field sensing element, each magnetic field sensing element comprising a sensing substrate, a sensing response layer, at least two sensing electrodes, and at least two sensing doped regions; at least one reference resistor, each reference resistor comprising a resistor substrate, a resistor response layer, at least two resistor electrodes, and at least two resistor doped regions; at least one current source, coupled to the magnetic field sensing element and the reference resistor; and a processing module, coupled to electrodes of the magnetic field sensing element and the reference resistor for coupling to the current source, and configured to receive a voltage of the magnetic field sensing element and a voltage of the reference resistor, correspondingly calculate resistance values of the magnetic field sensing element and the reference resistor, and adjust an input and/or output of the magnetic field sensing element, wherein the sensing response layer and the sensing doped regions form a same doped structure as the resistor response layer and the resistor doped regions, an average current of the magnetic field sensing element is configured to flow in a first plane, the resistor response layer has a first thickness and a first length, the first thickness and the first length satisfy a preset multiple relationship to make an average current in the reference resistor at least partially flow in a direction of the first thickness, and the direction of the first thickness is perpendicular to the first plane.

As a further improvement of an embodiment of the present invention, the compensation circuit for a magnetic field sensing element further comprises a first switching module disposed between the current source and the magnetic field sensing element and configured to switch a connection relationship between different sensing electrodes of the magnetic field sensing element and the current source, and the processing module is configured to correspondingly receive different voltages from the sensing electrode in different connection relationships, and calculate the resistance value of the magnetic field sensing element according to an average value of the different voltages.

As a further improvement of an embodiment of the present invention, the compensation circuit for a magnetic field sensing element further comprises a second switching module disposed between the current source and the reference resistor and configured to switch the connection relationship between different resistor electrodes of the reference resistor and the current source, and the processing module is configured to correspondingly receive different voltage of the resistor electrode in different connection relationships, and calculate the resistance value of the reference resistor according to an average value of the different voltages.

As a further improvement of an embodiment of the present invention, the preset multiple relationship is configured such that the first length is less than six times the first thickness.

As a further improvement of an embodiment of the present invention, the resistor response layer is disposed close to a first surface of the resistor substrate, the resistor response layer is a low-concentration N-type doped layer and/or epitaxial layer disposed on the resistor substrate, the resistor doped regions are disposed on a side in the resistor response layer close to the first surface, the resistor doped regions are high-concentration N-type doped regions, the resistor electrodes are disposed on a side of the resistor doped regions away from the resistor response layer, and the resistor electrodes, the resistor doped regions, and the resistor response layer are electrically coupled in sequence.

As a further improvement of an embodiment of the present invention, the reference resistor further comprises a resistor isolation layer and an isolation doped region disposed in the resistor isolation layer; the resistor isolation layer is disposed close to the first surface, the resistor isolation layer is a medium-concentration P-type doped layer and/or an oxide insulation layer disposed in the resistor response layer, the isolation doped region is disposed on a side of the resistor isolation layer close to the first surface, and the isolation doped region is a high-concentration P-type doped region; and the resistor isolation layer is disposed between the at least two resistor doped regions, and is configured with a volume less than that of the resistor response layer, the resistor isolation layer and the resistor response layer form a current channel for conducting a current, and the current channel at least partially extends in the direction of the first thickness.

As a further improvement of an embodiment of the present invention, the reference resistor comprises a first resistor electrode, a second resistor electrode, a first resistor doped region, a second resistor doped region, a third resistor doped region, a first resistor response layer, and a second resistor response layer, the third resistor doped region is a high-concentration N-type doped region formed on the resistor substrate, and is coupled to the first resistor response layer and the second resistor response layer, the first resistor electrode, the first resistor doped region, and the first resistor response layer are disposed on one side of the third resistor doped region, and the second resistor electrode, the second resistor doped region, and the second resistor response layer are disposed on the other side of the third resistor doped region; and an extension length of the third resistor doped region in the direction of the first thickness is less than extension lengths of the first resistor response layer and the second resistor response layer in the direction of the first thickness.

As a further improvement of an embodiment of the present invention, the reference resistor further comprises a first resistor isolation layer, a second resistor isolation layer, a first isolation doped region, and a second isolation doped region, the first resistor isolation layer and the second resistor isolation layer are respectively disposed close to the first surface, the first resistor isolation layer is a medium-concentration P-type doped layer and/or an oxide insulation layer disposed in the first resistor response layer, the second resistor isolation layer is a medium-concentration P-type doped layer and/or an oxide insulation layer disposed in the second resistor response layer, the first isolation doped region and the second isolation doped region are respectively disposed on sides of the first resistor isolation layer and the second resistor isolation layer close to the first surface, and the first isolation doped region and the second isolation doped region are both high-concentration P-type doped regions: the first resistor isolation layer is disposed between the first resistor doped region and the third resistor doped region, and is configured with a volume less than that of the first resistor response layer, the first resistor isolation layer and the resistor response layer form a first current channel for conducting a current, and the first current channel at least partially extends in the direction of the first thickness; and the second resistor isolation layer is disposed between the third resistor doped region and the second resistor doped region, and is configured with a volume less than that of the second resistor response layer, the second resistor isolation layer and the resistor response layer form a second current channel for conducting a current, and the second current channel at least partially extends in the direction of the first thickness.

As a further improvement of an embodiment of the present invention, the compensation circuit for a magnetic field sensing element comprises a first reference resistor and a second reference resistor that respectively extend in a first direction and a second direction and are configured to be electrically coupled to each other, the first direction and the second direction are arranged at an angle, average currents in the first reference resistor and the second reference resistor at least partially flow in the first direction and the second direction respectively, and the first direction and the second direction are arranged at angles to a direction of the average current of the magnetic field sensing element.

As a further improvement of an embodiment of the present invention, the first reference resistor and the second reference resistor are connected through the resistor doped regions and/or the resistor electrodes, and an angle between the first direction and the second direction is 90 degrees.

As a further improvement of an embodiment of the present invention, the magnetic field sensing element is configured to be a square, and the first reference resistor and the second reference resistor are respectively disposed on outer sides of two lateral sides of the magnetic field sensing element.

As a further improvement of an embodiment of the present invention, the compensation circuit for a magnetic field sensing element comprises a first magnetic field sensing element and a second magnetic field sensing element, the first magnetic field sensing element comprises a first sensing electrode, a second sensing electrode, a third sensing electrode, and a fourth sensing electrode, and the second magnetic field sensing element comprises a fifth sensing electrode, a sixth sensing electrode, a seventh sensing electrode, and an eighth sensing electrode; the first sensing electrode and the sixth sensing electrode are connected and form a first connecting point, the second sensing electrode and the seventh sensing electrode are connected and form a second connecting point, the fourth sensing electrode and the fifth sensing electrode are connected and form a third connecting point, and the third sensing electrode and the eighth sensing electrode are connected and form a fourth connecting point; and the first magnetic field sensing element and the second magnetic field sensing element are configured with a first action state and a second action state: in the first action state, one of the first connecting point and the fourth connecting point is coupled to the current source, and the other is coupled to a ground level; and in the second action state, one of the second connecting point and the third connecting point is coupled to the current source, and the other is coupled to the ground level.

As a further improvement of an embodiment of the present invention, the compensation circuit for a magnetic field sensing element comprises a first magnetic field sensing element, a second magnetic field sensing element, a third magnetic field sensing element, and a fourth magnetic field sensing element, the first magnetic field sensing element comprises a first sensing electrode, a second sensing electrode, a third sensing electrode, and a fourth sensing electrode, the second magnetic field sensing element comprises a fifth sensing electrode, a sixth sensing electrode, a seventh sensing electrode, and an eighth sensing electrode, the third magnetic field sensing element comprises a ninth sensing electrode, a tenth sensing electrode, an eleventh sensing electrode, and a twelfth sensing electrode, and the fourth magnetic field sensing element comprises a thirteenth sensing electrode, a fourteenth sensing electrode, a fifteenth sensing electrode, and a sixteenth sensing electrode; the first sensing electrode, the eighth sensing electrode, the eleventh sensing electrode, and the fourteenth sensing electrode are connected and form a first connecting point, the second sensing electrode, the fifth sensing electrode, the twelfth sensing electrode, and the fifteenth sensing electrode are connected and form a second connecting point, the third sensing electrode, the sixth sensing electrode, the ninth sensing electrode, and the sixteenth sensing electrode are connected and form a third connecting point, and the fourth sensing electrode, the seventh sensing electrode, the tenth sensing electrode, and the thirteenth sensing electrode are connected and form a fourth connecting point; the first magnetic field sensing element, the second magnetic field sensing element, the third magnetic field sensing element, and the fourth magnetic field sensing element are configured with a first action state and a second action state: in the first action state, one of the first connecting point and the third connecting point is coupled to the current source, and the other is coupled to a ground level: and in the second action state, one of the second connecting point and the fourth connecting point is coupled to the current source, and the other is coupled to the ground level.

To achieve one of the foregoing objectives of the present invention, an embodiment of the present invention provides a compensation method for a magnetic field sensing element, comprising: respectively receiving at least one group of voltage data from at least one magnetic field sensing element and current data from a current source coupled to the magnetic field sensing element, and respectively storing them as sensing voltage data and sensing current data; respectively receiving at least one group of voltage data from at least one reference resistor and current data from a current source coupled to the reference resistor, and respectively storing them as reference voltage data and reference current data: calculating sensing resistance data of the magnetic field sensing element according to the sensing voltage data and the sensing current data: calculating reference resistance data of the reference resistor according to the reference voltage data and the reference current data: calculating compensation resistance data according to the sensing resistance data and the reference resistance data: and compensating for outputs of the magnetic field sensing element and/or the current source according to the compensation resistance data.

As a further improvement of an embodiment of the present invention, the method specifically comprises: respectively receiving a plurality of groups of the sensing voltage data of the magnetic field sensing element in different action states: calculating an average sensing voltage value of the plurality of groups of the sensing voltage data, and calculating the sensing resistance data according to the average sensing voltage value and the sensing current data: respectively receiving a plurality of groups of the reference voltage data of the reference resistor in different action states; calculating an average reference voltage value of the plurality of groups of the reference voltage data, and calculating the reference resistance data according to the average reference voltage value and the reference current data: and calculating a difference between the sensing resistance data and the reference resistance data, and calculating an absolute value of the difference to obtain the compensation resistance data.

Compared with the prior art, in the compensation circuit for a magnetic field sensing element provided in the present invention, a reference resistor independent of the magnetic field sensing element is disposed, and the current direction inside the reference resistor is always perpendicular to the current direction inside the magnetic field sensing element. In this way, the sensitivity to stress can be significantly improved, and different responses of currents in different directions to stress can be used for subsequent compensation operations. In addition, the reference resistor and the magnetic field sensing element are configured with the same doped structure, so that the consistency of temperature can be greatly improved.

DETAILED DESCRIPTION

The present invention will be described in detail below with reference to the specific embodiments shown in the accompanying drawings. However, these embodiments are not intended to limit the present invention. All modifications in structures, methods, or functions made by those of ordinary skill in the art according to these embodiments are included in the protection scope of the present invention.

It should be noted that the terms "include", "comprise" or any other variation thereof are intended to cover a non-exclusive inclusion. Therefore, in the context of a process, a method, an object or a device that comprises a series of elements, the process, method, object or device not only comprises such elements, but also comprises other elements not specified expressly, or may also comprise inherent elements of the process, method, object or device. In addition, the terms such as "first", "second", "third", and "fourth" are used only for description, but are not intended to indicate or imply relative importance.

Magnetic field sensing elements are usually configured to use the interaction between a magnetic field and a current to reflect changes in the magnetic field by detecting more significant data such as current, voltage, and/or the like, so as to obtain magnetic field data indirectly. It is common in general technology that Hall sensors using the Hall effect are used as magnetic field sensing elements to implement functions such as compasses, magnetic switches, displacement measurement, current measurement, and rotating speed and angle measurement. Therefore, a magnetic field sensing element in the present invention may be alternatively implemented as a Hall sensor. Certainly, the magnetic field sensing element in the present invention is not limited to this type.

A magnetic field sensing element is usually configured as a semiconductor device. More specifically, a low-concentration N-type doped layer is combined with a peripheral integrated circuit to complete magnetic field sensing. However, on the one hand, in an operating state, the materials used to manufacture semiconductor devices have high requirements for physical parameters of the environment, especially for the effects of temperature and mechanical stress, and correspondingly generated responses will affect the detection accuracy of the magnetic field sensing element. On the other hand, in a processing state, because a package material and an internal chip have different coefficients of thermal expansion, when an external temperature changes during packaging, internal water vapor content changes, mechanical stress changes, and the output result of the magnetic field sensing element will further drift. Therefore, how to simultaneously reduce or even avoid the influence of temperature and mechanical stress on output parameters of the magnetic field sensing element is an urgent problem to be solved in the field and is also the purpose of the present invention.

Figure 1:
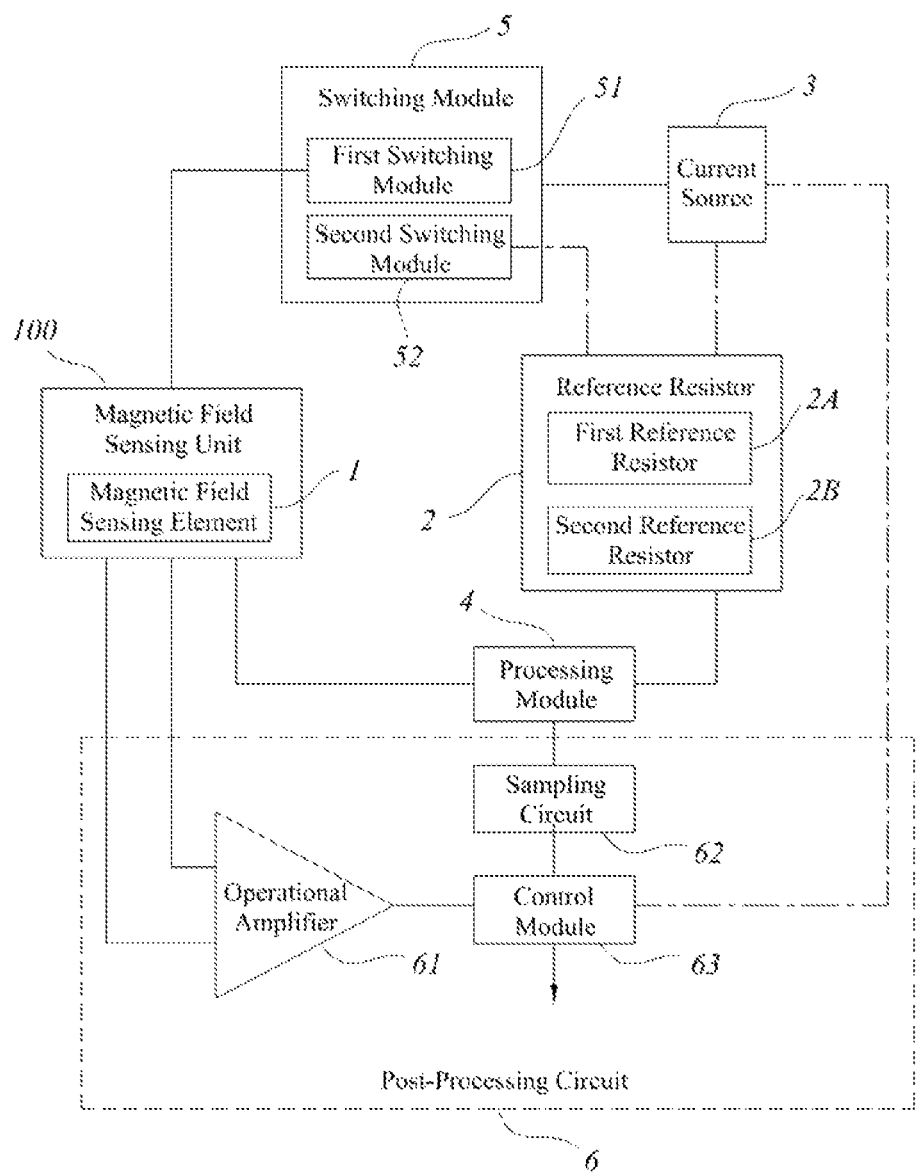
FIG. 1 is a structural principle diagram of a compensation circuit for a magnetic field sensing element according to an embodiment of the present invention.
Figure 2:
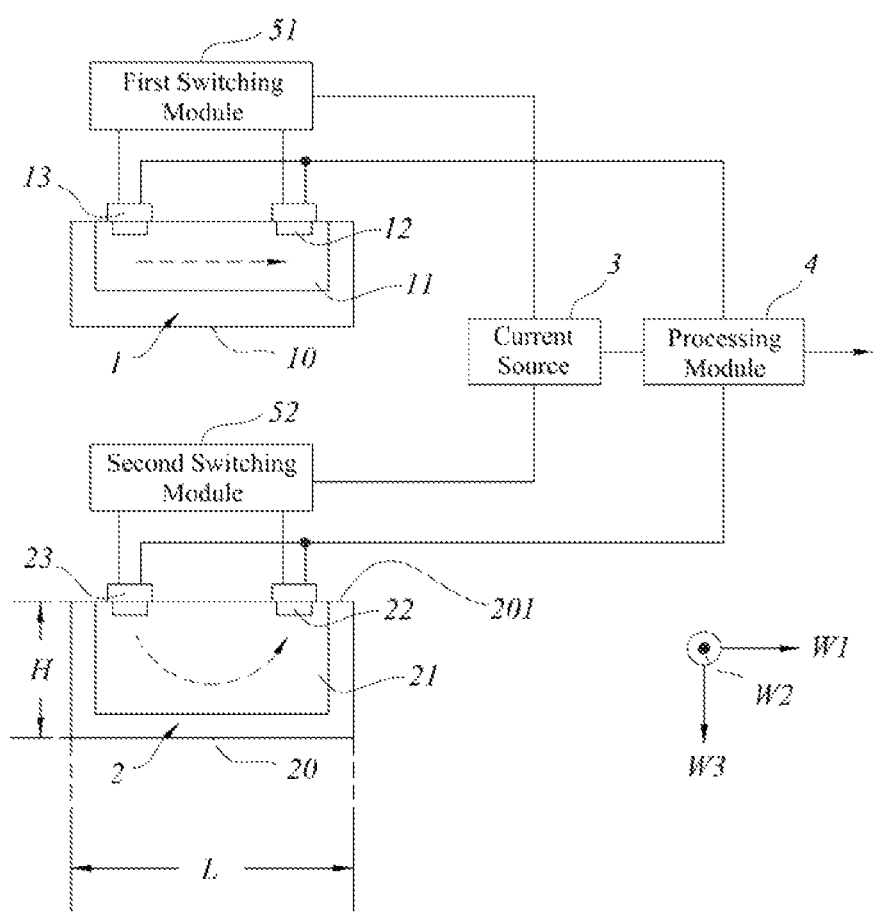
FIG. 2 is a partial structural diagram of a first example of a compensation circuit for a magnetic field sensing element according to an embodiment of the present invention.

As shown in FIG. 1 and FIG. 2, an embodiment of the present invention provides a compensation circuit for a magnetic field sensing element, specifically comprising a magnetic field sensing unit 100, at least one reference resistor 2, at least one current source 3, and a processing module 4. The magnetic field sensing unit 100 comprises at least one magnetic field sensing element 1 to be compensated. The current source 3 is respectively coupled to the magnetic field sensing element 1 and the reference resistor 2 to supply electrical energy with a constant current value to the two elements. In an embodiment in which a plurality of current sources 3 are disposed, currents outputted by the current sources 3 to the magnetic field sensing element 1 and the reference resistor 2 may be configured to be the same or may be configured to be different. This may be specifically adjusted according to requirements of a person skilled in the art.

The processing module 4 is specifically configured: to be at least coupled to the electrode of the magnetic field sensing element 1 coupling to the current source 3 and the electrode of the reference resistor 2 coupling to the current source 3, so as to receive voltage values across the magnetic field sensing element 1 and across the reference resistor 2; to correspondingly calculate the resistance value of the magnetic field sensing element 1 and the resistance value of the reference resistor 2; and to adjust the input and/or output of the magnetic field sensing element 1 according to the resistance values.

It needs to be noted that the meaning of the processing module 4 being configured to be "at least coupled to the electrode of the magnetic field sensing element 1 coupling to the current source 3 and the electrode of the reference resistor 2 coupling to the current source 3" is that the magnetic field sensing element 1 and/or the reference resistor 2 may be configured with an electrode for outputting a sensing value or another value in addition to the electrode for coupling to the current source 3 to receive electrical energy. The processing module 4 at least needs to be coupled to electrodes of the magnetic field sensing element 1 and the reference resistor 2 for receiving electrical energy in the present invention, thereby obtaining the voltage value across the magnetic field sensing element 1 and the voltage value across the reference resistor 2. Certainly, in another embodiment, the processing module 4 may be configured to be coupled to an electrode for outputting other data. This may be adjusted according to requirements of a person skilled in the art.

The meaning of the processing module 4 being configured to "adjust an input and/or output of the magnetic field sensing element 1 according to the resistance values" is that the processing module 4 may be configured to be coupled to the current source 3 to adjust the magnitude of the current input into the magnetic field sensing element 1 to achieve compensation, and/or configured to be coupled to the output terminal of the magnetic field sensing element 1 or the compensation circuit for the magnetic field sensing element as a whole to adjust the output magnetic field sensing data to achieve compensation.

Certainly, the term "coupled to" includes both a manner that two elements are directly connected and a manner that two elements are indirectly connected through another element. This should be known to a person skilled in the art and thus details are not described below again. In addition, technical solutions formed by direct connection and/or indirect connection can both be summarized in the present invention.

The processing module 4 may be configured to be integrated with functions such as data reception, operation, compensation, output, and/or the like in an embodiment. Certainly, in another embodiment, as shown in FIG. 1, the processing module 4 may be configured to be coupled to a post-processing circuit 6 to cooperate to achieve the foregoing functions. In this case, the processing module 4 is configured to calculate and output compensation resistance data according to the resistance value of the magnetic field sensing element 1 and the resistance value of the reference resistor 2: the post-processing circuit 6 specifically comprises an operational amplifier 61, a sampling circuit 62, and a control module 63, wherein the input terminal of the operational amplifier 61 is configured to be coupled to the electrode of the magnetic field sensing element 1 (or the magnetic field sensing unit 100) for outputting an electrical signal (referred to as the output electrical signal hereinafter) representing the magnetic field condition, the output terminal of the operational amplifier 61 is coupled to the control module 63, and the sampling circuit 62 is coupled to the processing module 4 and the control module 63 respectively.

Specifically, the operational amplifier 61 is configured to receive the output electrical signal of the magnetic field sensing element 1 (or the magnetic field sensing unit 100), and perform operational amplification on the output electrical signal and then transmit the amplified output electrical signal to the control module 63. The sampling circuit 62 is configured to sample the compensation resistance data obtained by the operation of the processing module 4, and transmit sampled data to the control module 63. In an embodiment, the control module 63 is configured to compensate for the output electrical signal according to the compensation resistance data, and to perform operation to obtain magnetic field sensing data to output.

Certainly, in another embodiment, referring to the "dash dotted line" connection part in FIG. 1, the control module 63 may also be configured to be coupled to the current source 3, perform operation on the compensation resistance data obtained by sampling to obtain the compensation current data, and then perform compensation on the current source 3 to compensate for the output electrical signal by adjusting the magnitude of the output current of the current source 3.

It needs to be reiterated that the foregoing configuration of the post-processing circuit 6 and the compensation manner for the magnetic field sensing element are merely one of the embodiments of the present invention. A person skilled in the art may certainly configure no additional post-processing circuit 6 or may certainly select one or both of compensation of the current source 3 and compensation of the output electrical signal to achieve the expected technical effect.

Based on the foregoing structural configuration, the processing module 4 can be used to achieve the effect of performing compensation on the magnetic field sensing element 1 after the compensation resistance data is calculated by combining the resistance values of the magnetic field sensing element 1 and the reference resistor 2. Further, for the specific structures of the magnetic field sensing element 1 and the reference resistor 2, the present invention has the following special configuration:

In an aspect, each magnetic field sensing element 1 comprises a sensing substrate 10, a sensing response layer 11, at least two sensing electrodes 13, and at least two sensing doped regions 12. Each reference resistor 2 comprises a resistor substrate 20, a resistor response layer 21, at least two resistor electrodes 23, and at least two resistor doped regions 22. A doped structure formed by the sensing response layer 11 and the sensing doped region 12 is the same as a doped structure formed by the resistor response layer 21 and the resistor doped regions 22. In this way, the consistency of temperature of the magnetic field sensing element 1 and the reference resistor 2 can be improved, so as to focus the compensated object on mechanical stress.

In another aspect, an average current of the magnetic field sensing element 1 is configured to flow in a first plane, which may be defined as a plane formed by a first direction W1 and a second direction W2 as shown in FIG. 2 in an embodiment. The resistor response layer 21 of the reference resistor 2 has a first thickness H and a first length L. The first thickness H and the first length L satisfy a preset multiple relationship, so that an average current in the reference resistor 2 at least partially flows in a direction of the first thickness H. The direction of the first thickness H is perpendicular to the first plane.

At the same time, the processing module 4 is further configured to be coupled to the sensing electrodes 13 and the resistor electrodes 23 to respectively receive the voltage of the magnetic field sensing element 1 and the voltage of the reference resistor 2, so as to correspondingly calculate the resistance value of the magnetic field sensing element 1 and the resistance value of the reference resistor 2. Here, the specific numbers of the sensing electrodes 13 and the resistor electrodes 23 coupled to the processing module 4 may be adjusted according to actual cases. The processing module 4 may be configured to be coupled to the two sensing electrodes 13 and the two resistor electrodes 23 (the embodiment shown in FIG. 2) respectively, or may be coupled to one sensing electrode 13 and one resistor electrode 23, or coupled to a plurality of sensing electrodes 13 and a plurality of resistor electrodes 23.

The term "flow" here represents that the present invention does not limit the specific flow direction of the average current of the magnetic field sensing element 1 in the first plane. It can mean not only that the average current flows in the first direction W1 and its opposite direction, and but also can mean that the average current flows in the second direction W2 and its opposite direction or that the average current flows at angles with the first direction W1 and the second direction W2. It should be noted that whether the second direction W2 is perpendicular to the first direction W1 in the first plane or even whether there is the second direction W2, this embodiment does not matter, and the expected technical effect of the present invention can be achieved as long as it is satisfied that the direction represented by the first thickness H is always perpendicular to the flow direction of the average current of the magnetic field sensing element 1 in different switching states.

In this way, because the average current of the reference resistor 2 is at least partially perpendicular to the average current of the magnetic field sensing element 1 in different states, in a case that the processing module 4 is equipped with a preset compensation method for the magnetic field sensing element, a difference between a change in the resistance value of the magnetic field sensing element 1 under the action of mechanical stress and a change in the resistance value of the reference resistor 2 under the action of mechanical stress can be used to implement compensation. In an embodiment, when the mechanical stress acts on the first plane in a vertical direction or an angled direction, the resistance value of the magnetic field sensing element 1 increases in value under the action of the vertical component of the mechanical stress, and the resistance value of the reference resistor 2 decreases in value under the action of the vertical component of the mechanical stress. In addition, because the two has the same doped structure, errors caused by temperature effect are the same. Therefore, in a case that the influence of temperature is completely eliminated, deviation data (which may be the compensation resistance data) generated completely by the action of the mechanical stress can be calculated, and compensation can by realized according to the deviation data.

Further, in an embodiment, the "preset multiple relationship" is configured such that: the first length L is less than six times the first thickness H. The reference resistor 2 formed in this way has the first length L shorter than the length of a reference resistor in general technology, and has the first thickness H thicker than the thickness of a reference resistor in general technology. Therefore, the reference resistor 2 has more components of the average current in the direction of the first thickness H and more components of the average current in a direction perpendicular to the first plane (that is, perpendicular to the magnetic field sensing element 1), so that compensation effect is better.

Preferably, at least the direction of the average current of the magnetic field sensing element 1 is configured to be switchable in the first plane. Therefore, the processing module 4 can calculate the resistance values of the magnetic field sensing element 1 in different average current directions, to eliminate field effect inside the magnetic field sensing element 1. Based on this, the compensation circuit for the magnetic field sensing element further comprises a switching module 5. The switching module 5 at least comprises a first switching module 51 disposed between the current source 3 and the magnetic field sensing element 1.

The first switching module 51 is configured to switch a connection relationship between different sensing electrodes 13 of the magnetic field sensing element 1 and the current source 3, thereby changing the direction of the average current of the magnetic field sensing element 1. Correspondingly, the processing module 4 is configured to correspondingly receive different voltages of the sensing electrodes 13 in different connection relationships, and calculate the resistance value of the magnetic field sensing element 1 according to an average value of the different voltages.

Certainly, the switching module 5 is only proposed as a superordinate concept of the first switching module 51, representing that other switching modules may be further comprised in another embodiment, and is not used as an essential technical feature of the present invention. The present invention can still achieve the expected technical effect even if the concept of the switching module 5 does not exist.

In an embodiment, the switching module 5 may further comprise a second switching module 52 disposed between the current source 3 and the reference resistor 2. The second switching module 52 is specifically configured to switch the connection relationship between different resistor electrodes 23 of the reference resistor 2 and the current source 3, thereby changing the direction of the average current of the reference resistor 2. Correspondingly, the processing module 4 is configured to correspondingly receive different voltages of the resistor electrodes 23 in different connection relationships, and calculate the resistance value of the reference resistor 2 according to an average value of the different voltages. In the embodiment, the average current of the reference resistor 2 and the average current of the magnetic field sensing element 1 may form more varied angle states for reflection in the resistance value of the magnetic field sensing element 1 and the resistance value of the reference resistor 2, resulting in a more accurate compensation effect. Certainly, in another embodiment, the compensation circuit for the magnetic field sensing element may not provide the second switching module 52, but directly connect the current source 3 to one resistor electrode 23 of the reference resistor 2 and connect the other resistor electrode 23 to ground, through which the object of the present invention can also be achieved.

In addition, as can be known from FIG. 1, FIG. 2, FIG. 6, and FIG. 8, in an embodiment, two reference resistors 2 may be configured, namely, a first reference resistor 2A and a second reference resistor 2B. In an aspect, the first reference resistor 2A and the second reference resistor 2B may be configured to separately have all the foregoing features regarding the internal structure of the reference resistor 2. In another aspect, the first reference resistor 2A and the second reference resistor 2B may be configured to respectively extend in the first direction W1 and the second direction W2 and to be electrically coupled to each other. In the embodiment, the first direction W1 and the second direction W2 are arranged at an angle. Therefore, the average current in the first reference resistor 2A at least partially flows in the first direction W1, and the average current in the second reference resistor 2B at least partially flows in the second direction W2, so as to increase a probability that a flow direction of the overall average current of the reference resistor 2 and a flow direction of the average current of the magnetic field sensing element 1 are arranged at an angle. Preferably, the first direction W1 and the second direction W2 are arranged at angles to a direction of the average current of the magnetic field sensing element 1.

When the average current of the magnetic field sensing element 1 is arranged at angles to the first direction W1 and the second direction W2, a plurality of embodiments can be derived. In an embodiment, the magnetic field sensing element 1 is configured to be a rectangle, the first direction W1 and the second direction W2 are arranged along adjacent sides of the rectangle, and the average current of the magnetic field sensing element 1 flows along any diagonal of the rectangle. In another embodiment, the magnetic field sensing element 1 is configured to be a rectangle, the first direction W1, the second direction W2, and one side of the rectangle are arranged to form a triangle, and the average current of the magnetic field sensing element 1 flows along any side of the rectangle. In still another embodiment, the magnetic field sensing element 1 is configured to be a circle, the first direction W1 and the second direction W2 are respectively arranged along the circumference of the circle, and the average current of the magnetic field sensing element 1 flows in a diameter direction of the circle.

As can be seen, in this embodiment, the plane formed by the first direction W1 and the second direction W2 may be defined as the first plane. Naturally, the direction of the first thickness H may be correspondingly defined as a third direction W3. In this case, the average current of the reference resistor 2 may be explained as: flowing at least partially in the first direction W1 and/or the second direction W2, and at least partially in the third direction W3.

Preferably, as shown in FIG. 2, FIG. 3, FIG. 6, and FIG. 8, the first reference resistor 2A and the second reference resistor 2B are connected through the resistor doped regions 22 and the resistor electrodes 23. The part where the first reference resistor 2A and the second reference resistor 2B are connected forms a connection electrode 233. Certainly, in another embodiment, the connection may be separately completed by the resistor doped regions 22 or may be separately completed by the connection electrode 233. This is not limited in the present invention. In an embodiment in which the reference resistor 2 comprises the connection electrode 233, the shape of the connection electrode 233 usually reflects a relative position relationship between the first reference resistor 2A and the second reference resistor 2B. In a preferred embodiment, the first reference resistor 2A and the second reference resistor 2B may be configured to have an included angle of 90 degrees, and the connection electrode 233 is correspondingly configured in an "L" shape.

Continuing to refer to FIG. 2, in a first example of an embodiment of the present invention, the resistor response layer 21 is configured to be disposed close to a first surface 201 of the resistor substrate 20, and the resistor response layer 21 is a low-concentration N-type doped layer and/or an epitaxial layer disposed on the resistor substrate 20, specifically a low-concentration N-type doped layer doped on the resistor substrate 20, or an epitaxial layer deposited on the resistor substrate 20, or a composite structure of an epitaxial layer and an N-type doped layer (in an embodiment, the N-type doped layer is doped in the epitaxial layer). The resistor doped regions 22 are disposed on a side in the resistor response layer 21 close to the first surface 201, and the resistor doped regions 22 are high-concentration N-type doped regions. The resistor electrodes 23 are disposed on the side of the resistor doped regions 22 away from the resistor response layer 21. Further, the resistor electrodes 23, the resistor doped regions 22, and the resistor response layer 21 are electrically coupled in sequence. In this way, the same doped structure as the magnetic field sensing element 1 is formed and an electrical conduction is realized.

The "high-concentration" and the "low-concentration" can alternatively implement the general technical solutions in the art. In an embodiment, the high-concentration may be defined as a concentration greater than $1 \times 10^{18}/cm^3$ and less than or equal to $1 \times 10^{19}/cm^3$, and the low-concentration may be defined as a concentration less than or equal to $1 \times 10^{17}/cm^3$.

It needs to be noted that the first surface 201 may be defined as a position of the resistor substrate 20 close to the top in the third direction W3 in FIG. 2 or may be defined as a position close to the bottom. It may be understood that the first surface 201 is defined herein to emphasize a relative position relationship between the internal components of the reference resistor 2. Although the first surface 201 is defined as a longitudinally upper position in the accompanying drawings and the following description, in fact, the first surface 201 does not have any other limiting meaning. Certainly, those skilled in the art may not be limited to defining the relative positions of all internal structures of the reference resistor 2 below. Any technical solution that has another relative position configuration and can achieve the expected technical effect will fall within the protection scope of the present invention. In other words, the definitions of the positional relationship about the first surface 201 described below are all nonessential technical features.

At this time, because the reference resistor 2 is configured to have the first thickness H with a relatively large value, the average current inside the reference resistor 2 is formed to sequentially pass through one of resistor electrodes 23 and one of resistor doped regions 22, flow in an arc-shaped direction in the resistor response layer 21, and then enter the other resistor doped region 22 and the other resistor electrode 23.

Figure 3:
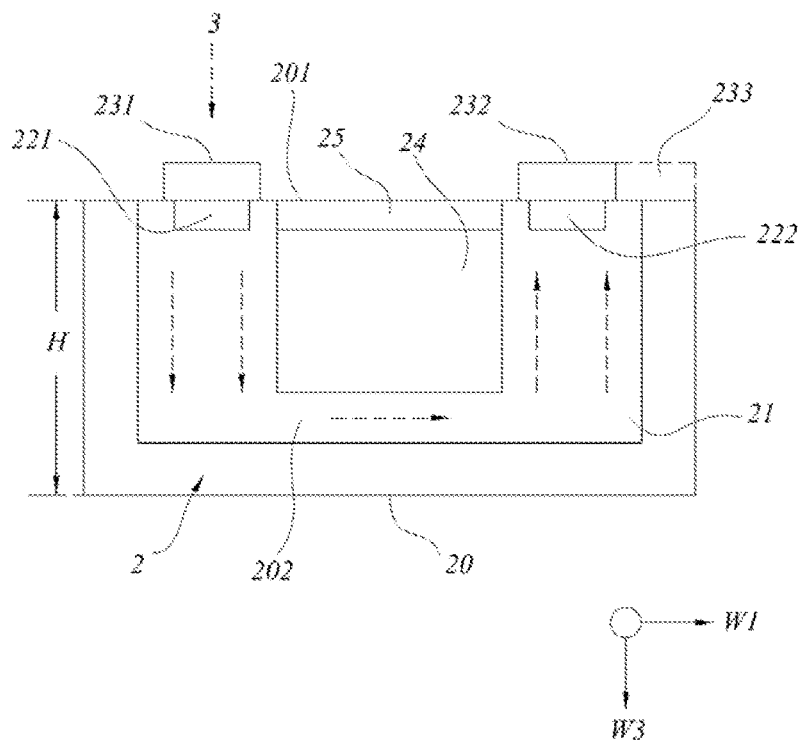
FIG. 3 is a schematic diagram of the structure of a reference resistor in a second example of a compensation circuit for a magnetic field sensing element according to an embodiment of the present invention.

Preferably, in a second example of an embodiment of the present invention, in order to further increase the component of the average current flowing in the direction of the first thickness H, as shown in FIG. 3, the reference resistor 2 further comprises a resistor isolation layer 24 and an isolation doped region 25 disposed in the resistor isolation layer 24. The resistor isolation layer 24 is disposed close to the first surface 201, and is a medium-concentration P-type doped layer and/or an oxide insulation layer disposed in the resistor response layer 21, which may be specifically a medium-concentration P-type doped layer doped in the resistor response layer 21, or an oxide insulation layer formed in the resistor response layer 21, or a composite structure of a medium-concentration P-type doped layer and an oxide insulation layer. The isolation doped region 25 is disposed on a side of the resistor isolation layer 24 close to the first surface 201, and the isolation doped region 25 is a high-concentration P-type doped region. The "middle-concentration" can also alternatively implement a general technical solution in the art. In an embodiment, the medium-concentration is defined as a concentration greater than $1 \times 10^{17}/cm^3$ and less than or equal to $1 \times 10^{18}/cm^3$.

The oxide insulation layer herein is preferably formed by using a Shallow Trench Insulator (STI) process, and may also have another configuration in another embodiment. Further, the resistor isolation layer 24 is disposed between the at least two resistor doped regions (that is, a first resistor doped region 221 and a second resistor doped region 222 in the figure), and is configured with a volume less than that of the resistor response layer 21 and form a current channel 202 for conducting a current with the resistor response layer 21, that is, an "冂"-shaped part shown in FIG. 3. The current channel extends at least partially in the direction of the first thickness H, that is, the two sides of the resistor isolation layer 24 extend in the direction of the first thickness H in the figure.

Based on this, as shown in FIG. 3, it is defined that the reference resistor 2 comprises a first resistor electrode 231, a second resistor electrode 232, the first resistor doped region 221, and the second resistor doped region 222. When the first resistor electrode 231 is coupled to the current source 3, the current flows into the reference resistor 2 through the first resistor electrode 231 and enters the first resistor doped region 221. Then, the current flows downward in the third direction W3 in the resistor response layer 21 on the left side of the resistor insulation layer 24, moves in the first direction W1 under the guidance of the resistor substrate 20, and then flows in an opposite direction of the third direction W3 into the second resistor doped region 222 and the second resistor electrode 232. In this way, the component of the average current in the reference resistor 2 flowing in the direction (that is, the third direction W3 and its opposite direction in the figure, which is the same hereinafter) of the first thickness H is increased.

Figure 4:
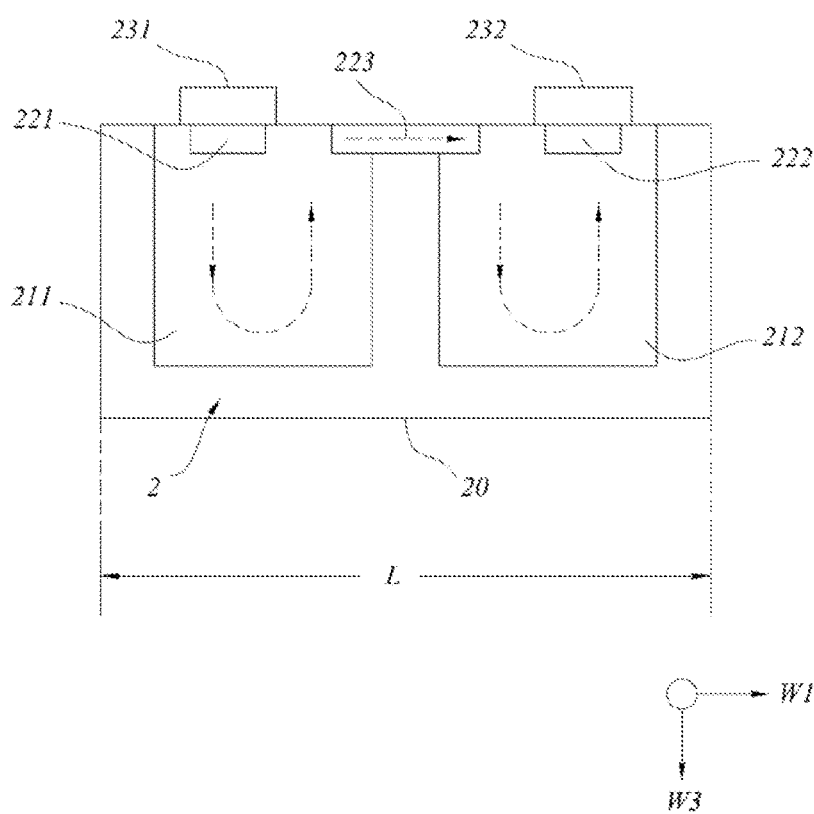
FIG. 4 is a schematic diagram of the structure of a reference resistor in a third example of a compensation circuit for a magnetic field sensing element according to an embodiment of the present invention.

Preferably, as shown in FIG. 4, in a third example of an embodiment of the present invention, it is also possible to increase the bending of arc-shaped flowing of the current by shortening the component of the average current flowing in the direction (that is, the first direction W1 and its the opposite direction in the figure, which is the same hereinafter) of the first length L once in the first example, so as to increase the component of the average current in the third direction W3 in a disguised form. In the example, the reference resistor 2 further comprises a third resistor doped region 223. The foregoing resistor response layer 21 is divided into a first resistor response layer 211 and a second resistor response layer 212 in this embodiment. The third resistor doped region 223 is a high-concentration N-type doped region formed on the resistor substrate 20, and is coupled to (or in communication with) the first resistor response layer 211 and the second resistor response layer 212.

Further, the first resistor electrode 231, the first resistor doped region 221, and the first resistor response layer 211 are disposed on one side of the third resistor doped region 223. The second resistor electrode 232, the second resistor doped region 222, and the second resistor response layer 212 are disposed on the other side of the third resistor doped region 223. Preferably, an extension length of the third resistor doped region 223 in the direction (that is, the third direction W3 and its opposite direction) of the first thickness is less than extension lengths of the first resistor response layer 211 and the second resistor response layer 212 in the direction of the first thickness.

In this way, a part of the average current of the reference resistor 2 in the first resistor response layer 211 is configured to flow in an arc-shaped line with a larger curvature, and enter the third resistor doped region 223. The current flows through the third resistor doped region 223 under guidance in the first direction W1 to enter the second resistor response layer 212, and correspondingly, flows in an arc-shaped line with a larger curvature to enter the second resistor doped region 222 and the second resistor electrode 232.

Figure 5:
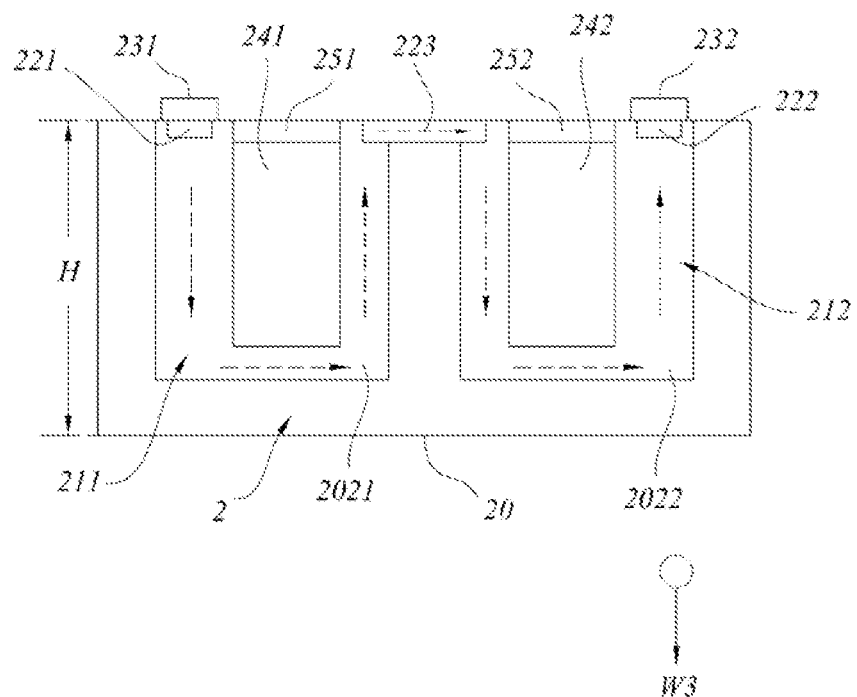
FIG. 5 is a schematic diagram of the structure of a reference resistor in a fourth example of a compensation circuit for a magnetic field sensing element according to an embodiment of the present invention.

The technical effect of increasing the component of the average current in the direction of the first thickness H can be achieved in both the foregoing manners. Further, the present invention provides a fourth example of the embodiment by combining the foregoing two technical solutions, as shown in FIG. 5.

In the example, the reference resistor 2 and the resistor substrate 20 separately have the following configurations: in the fourth example, two resistor isolation layers 24 and two isolation doped regions 25 are disposed in the first resistor response layer 211 and the second resistor response layer 212, which are sequentially a first resistor isolation layer 241, a first isolation doped region 251, a second resistor isolation layer 242, and a second isolation doped region 252. Preferably, the first resistor isolation layer 241 and the second resistor isolation layer 242 are separately disposed close to the first surface. The first resistor isolation layer 241 is a medium-concentration P-type doped layer and/or an oxide isolation layer disposed in the first resistor response layer 211, which may be specifically a medium-concentration P-type doped layer doped in the first resistor response layer 211, or an oxide isolation layer formed in the first resistor response layer 211, or a composite structure of a medium-concentration P-type doped layer and an oxide isolation layer. The second resistor isolation layer 242 is a medium-concentration P-type doped layer and/or an oxide isolation layer disposed in the second resistor response layer 212, which may be specifically a middle-concentration P-type doped layer doped in the second resistor response layer 212, or an oxide isolation layer formed in the second resistor response layer 212, or a composite structure of a medium-concentration P-type doped layer and an oxide isolation layer. The first isolation doped region 251 and the second isolation doped region 252 are respectively disposed on sides of the first resistor isolation layer 241 and the second resistor isolation layer 242 close to the first surface, and the first isolation doped region 251 and the second isolation doped region 252 are both high-concentration P-type doped regions in an embodiment.

Similar to the resistor isolation layer 24 and the isolation doped region 25 in the second example, the first resistor isolation layer 241 is disposed between the first resistor doped region 221 and the third resistor doped region 223, and is configured with a volume less than that of the first resistor response layer 211. The first resistor isolation layer 241 and the first resistor response layer 211 form a first current channel 2021 (an "冂"-shaped channel located on the left side of the third resistor doped region 223 in the figure) for conducting a current. The first current channel 2021 at least partially extends in the direction (the third direction W3 and its opposite direction) of the first thickness H. The second resistor isolation layer 242 is disposed between the third resistor doped region 223 and the second resistor doped region 222, and is configured with a volume less than that of the second resistor response layer 212. The second resistor isolation layer 242 and the second resistor response layer 212 form a second current channel 2022 (a "冂"-shaped channel located on the right side of the third resistor doped region 223 in the figure) for conducting a current, and the second current channel 2022 at least partially extends in the direction of the first thickness H.

In this way, a configuration of double "冂"-shaped current channels is formed, and the current channels are in communication through the third resistor doped region 223 with a narrow depth. The current passes through the first resistor electrode 231 and the first resistor doped region 221 on one side to enter the first current channel 2021, then passes through the third resistor doped region 223 into the second current channel 2022, and eventually enters the second resistor doped region 222 and the second resistor electrode 232 on the other side, so that the component of the average current in the direction of the first thickness H can be further increased.

Figure 6:
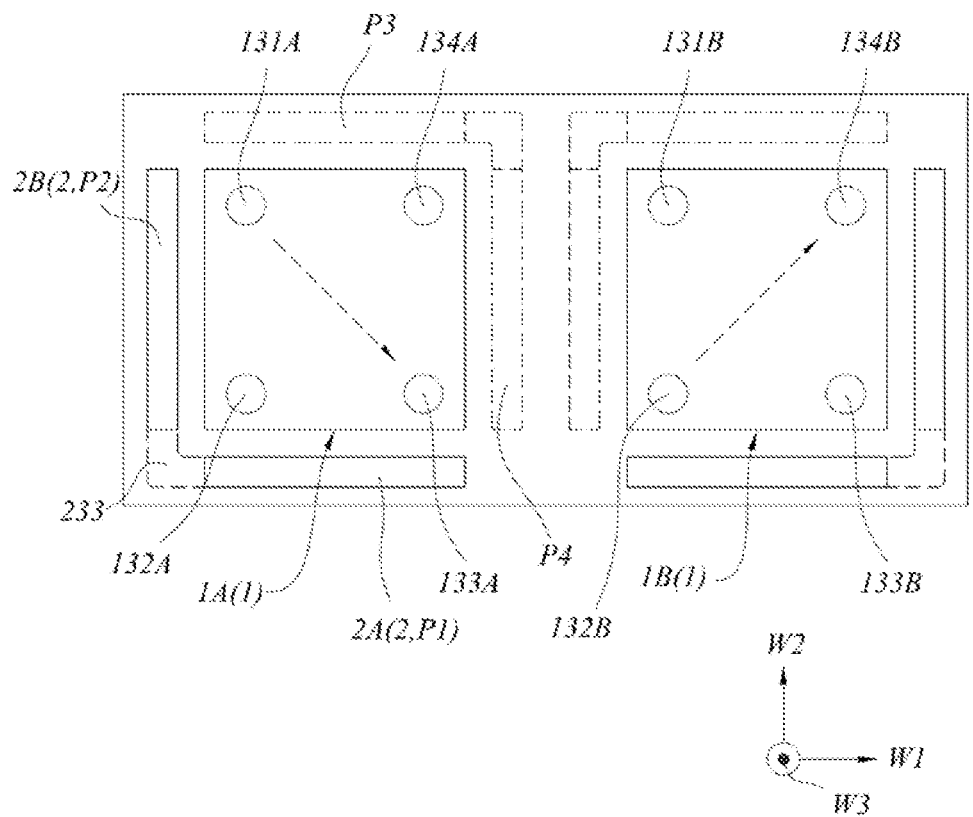
FIG. 6 is a schematic diagram of the matching structure of a reference resistor and a magnetic field sensing element of a compensation circuit for a magnetic field sensing element according to another embodiment of the present invention.

Further, FIG. 6 is a schematic diagram of the matching structure of the reference resistor 2 and the magnetic field sensing element 1 of the compensation circuit for the magnetic field sensing element according to another embodiment of the present invention. As can be known by separately observing a group of the reference resistor 2 and the magnetic field sensing element 1 on the left side, the magnetic field sensing element 1 may be configured to be a square. The first reference resistor 2A and the second reference resistor 2B may be respectively disposed on outer sides of two lateral sides of the magnetic field sensing element 1. The connection electrode 233 may be further comprised between the first reference resistor 2A and the second reference resistor 2B.

In an aspect, this configuration manner may be alternatively applied to any technical solution mentioned in the present invention, to form an angle between the average current of the magnetic field sensing element 1 and the average current of the reference resistor 2. In another aspect, the outer sides herein refer to positions at which the first reference resistor 2A and the second reference resistor 2B are disposed, and may be a first position P1 shown in the figure and a second position P2 shown in the figure, or may be a third position P3 shown in the figure and a fourth position P4 shown in the figure. Certainly, one of the first reference resistor 2A and the second reference resistor 2B may be disposed at the third position P3, and the other is disposed at the second position P2, or one of the first reference resistor 2A and the second reference resistor 2B is disposed at the first position P1, and the other is disposed at the fourth position P4. Any technical solution that is formed in this way will fall within the protection scope of the present invention.

Continuing to refer to FIG. 6, in the embodiment of the present invention, the compensation circuit for the magnetic field sensing element comprises a first magnetic field sensing element 1A and a second magnetic field sensing element 1B. The first magnetic field sensing element 1A comprises a first sensing electrode 131A, a second sensing electrode 132A, a third sensing electrode 133A, and a fourth sensing electrode 134A. The second magnetic field sensing element 1B comprises a fifth sensing electrode 131B, a sixth sensing electrode 132B, a seventh sensing electrode 133B, and an eighth sensing electrode 134B.

Figure 7:
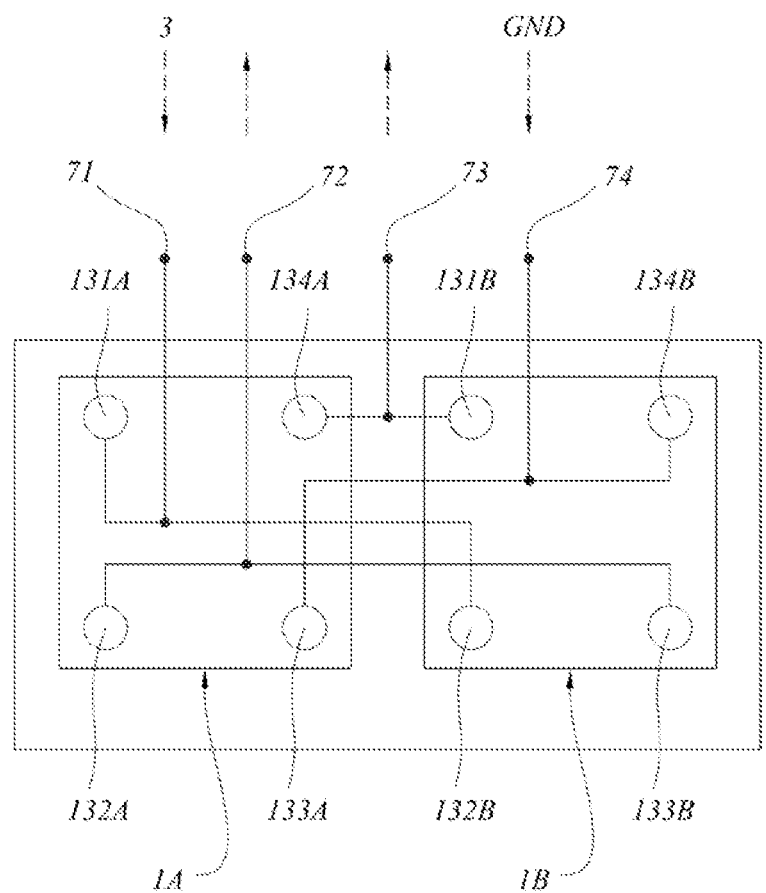
FIG. 7 is a schematic diagram of the structure of a magnetic field sensing element of a compensation circuit for a magnetic field sensing element according to another embodiment of the present invention.

For the connection relationships between the foregoing electrodes, as shown in FIG. 7, in the embodiment, preferably, the first sensing electrode 131A and the sixth sensing electrode 132B are connected and form a first connecting point 71. The second sensing electrode 132A and the seventh sensing electrode 133B are connected and form a second connecting point 72. The fourth sensing electrode 134A and the fifth sensing electrode 131B are connected and form a third connecting point 73. The third sensing electrode 133A and the eighth sensing electrode 134B are connected and form a fourth connecting point 74.

Further, the first magnetic field sensing element 1A and the second magnetic field sensing element 1B are configured with a first action state and a second action state.

In the first action state, one of the first connecting point 71 and the fourth connecting point 74 is coupled to the current source 3, and the other is coupled to a ground level.

In the second action state, one of the second connecting point 72 and the third connecting point 73 is coupled to the current source 3, and the other is coupled to the ground level.

In the foregoing two action states, other connecting points that are not restrictively described may be used as output terminals of the output electrical signal or may be coupled to no terminals. Specifically, in the first action state, the second connecting point 72 and the third connecting point 73 may be used as the output terminals, and in the second action state, the first connecting point 71 and the fourth connecting point 74 may be used as the output terminals. This is not limited in the present invention.

With reference to FIG. 6 and FIG. 7, in the first action state, when the first connecting point 71 is coupled to the current source 3 and the fourth connecting point 74 is coupled to the ground level, the average current in the first magnetic field sensing element 1A flows in the middle direction between the first direction W1 in the figure and the opposite direction of the second direction W2 in the figure, that is, from the first sensing electrode 131A to the third sensing electrode 133A. The average current in the second magnetic field sensing element 1B flows in the middle direction between the first direction W1 in the figure and the second direction W2 in the figure, that is, from the sixth sensing electrode 132B to the eighth sensing electrode 134B. Based on this, in the first action state, the fourth connecting point 74 is coupled to the current source 3, and the first connecting point 71 is coupled to the ground level, in the second action state, the second connecting point 72 is coupled to the current source 3, and the third connecting point 73 is coupled to the ground level, in the second action state, the third connecting point 73 is coupled to the current source 3, and the second connecting point 72 is coupled to the ground level, etc., these situations can be deduced, and details are not described again herein.

Figure 8:
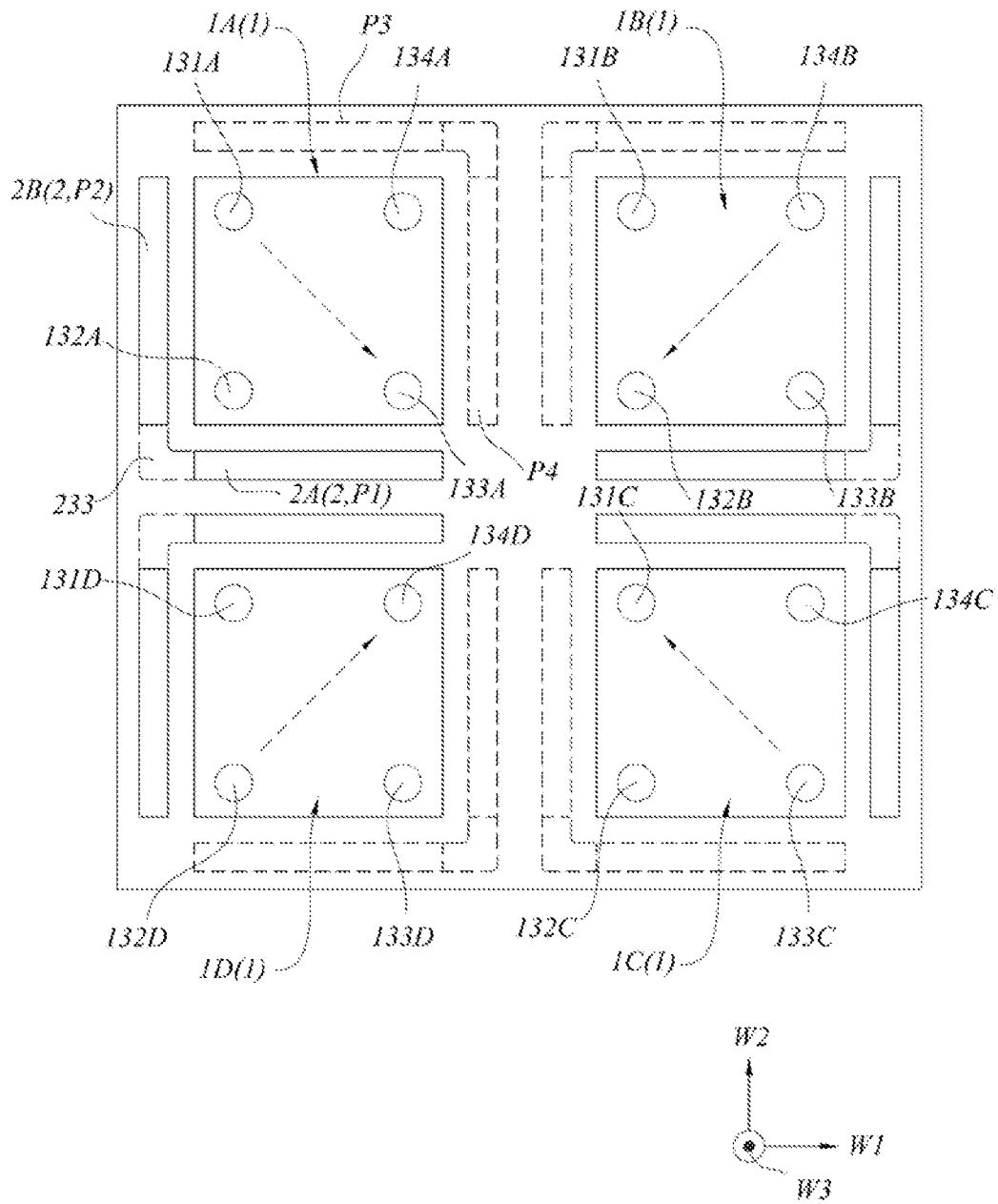
FIG. 8 is a schematic diagram of the matching structure of a reference resistor and a magnetic field sensing element of a compensation circuit for a magnetic field sensing element according to still another embodiment of the present invention.

Further, FIG. 8 is a schematic diagram of the matching structure of the reference resistor 2 and the magnetic field sensing element 1 of the compensation circuit for the magnetic field sensing element according to still another embodiment of the present invention. In the embodiment, the first reference resistor 2A, the second reference resistor 2B, and the connection electrode 233 disposed between the first reference resistor 2A and the second reference resistor 2B above may be alternatively implemented around each magnetic field sensing element 1, and there are the first position P1, the second position P2, the third position P3, and the fourth position P4 for placing the reference resistor 2 on an outer side of each magnetic field sensing element 1.

In the embodiment of the present invention, the compensation circuit for a magnetic field sensing element comprises a first magnetic field sensing element 1A, a second magnetic field sensing element 1B, a third magnetic field sensing element 1C, and a fourth magnetic field sensing element 1D. The first magnetic field sensing element 1A comprises a first sensing electrode 131A, a second sensing electrode 132A, a third sensing electrode 133A, and a fourth sensing electrode 134A. The second magnetic field sensing element 1B comprises a fifth sensing electrode 131B, a sixth sensing electrode 132B, a seventh sensing electrode 133B, and an eighth sensing electrode 134B. The third magnetic field sensing element 1C comprises a ninth sensing electrode 131C, a tenth sensing electrode 132C, an eleventh sensing electrode 133C, and a twelfth sensing electrode 134C. The fourth magnetic field sensing element 1D comprises a thirteenth sensing electrode 131D, a fourteenth sensing electrode 132D, a fifteenth sensing electrode 133D, and a sixteenth sensing electrode 134D.

Figure 9:
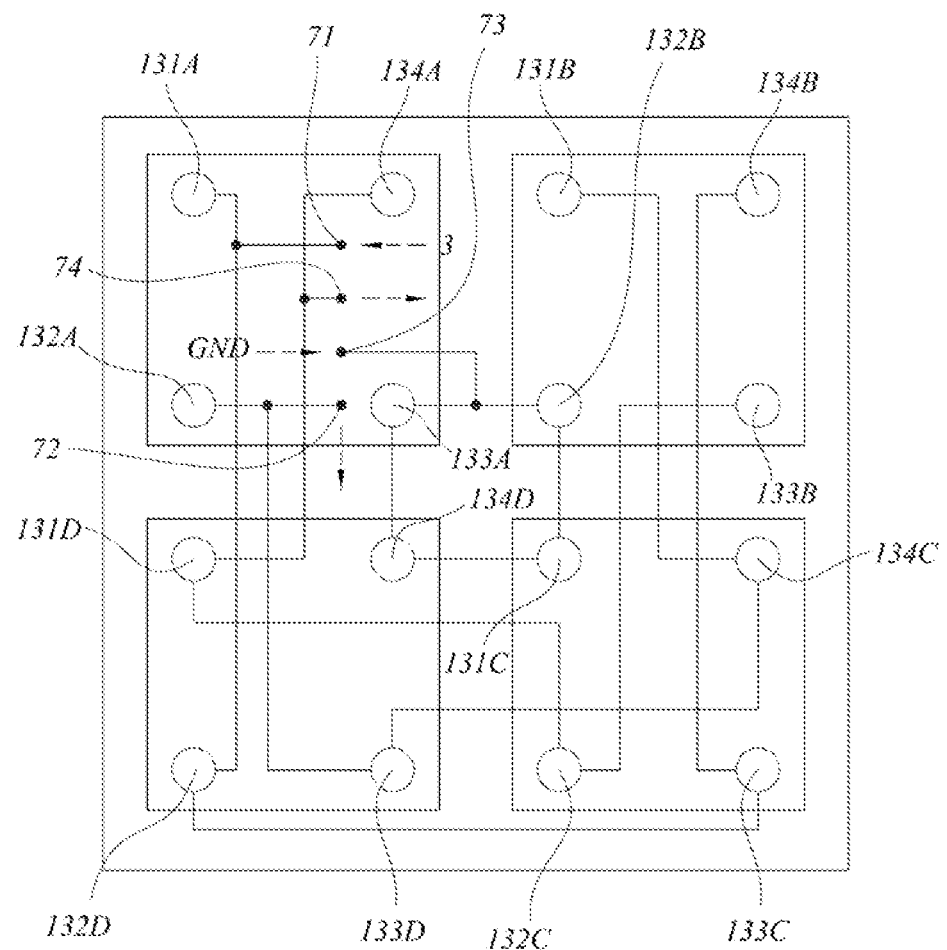
FIG. 9 is a schematic diagram of the structure of a magnetic field sensing element of a compensation circuit for a magnetic field sensing element according to still another embodiment of the present invention.

For the connection relationships between the foregoing electrodes, as shown in FIG. 9, in the embodiment, preferably, the first sensing electrode 131A, the eighth sensing electrode 134B, the eleventh sensing electrode 133C, and the fourteenth sensing electrode 132D are connected and form a first connecting point 71. The second sensing electrode 132A, the fifth sensing electrode 131B, the twelfth sensing electrode 134C, and the fifteenth sensing electrode 133D are connected and form a second connecting point 72. The third sensing electrode 133A, the sixth sensing electrode 132B, the ninth sensing electrode 131C, and the sixteenth sensing electrode 134D are connected and form a third connecting point 73. The fourth sensing electrode 134A, the seventh sensing electrode 133B, the tenth sensing electrode 132C, and the thirteenth sensing electrode 131D are connected and form a fourth connecting point 74.

Further, the first magnetic field sensing element 1A, the second magnetic field sensing element 1B, the third magnetic field sensing element 1C, and the fourth magnetic field sensing element ID are configured with a first action state and a second action state.

In the first action state, one of the first connecting point 71 and the third connecting point 73 is coupled to the current source 3, and the other is coupled to a ground level.

In the second action state, one of the second connecting point 72 and the fourth connecting point 74 is coupled to the current source 3, and the other is coupled to the ground level.

In the foregoing two action states, other connecting points that are not restrictively described may be used as output terminals of the output electrical signal or may be coupled to no terminals. Specifically, in the first action state, the second connecting point 72 and the fourth connecting point 74 may be used as the output terminals, and in the second action state, the first connecting point 71 and the third connecting point 73 may be used as the output terminals. This is not limited in the present invention.

With reference to FIG. 8 and FIG. 9, in the first action state, when the first connecting point 71 is coupled to the current source 3 and the third connecting point 73 is coupled to the ground level, the average current in the first magnetic field sensing element 1A flows in the middle direction between the first direction W1 in the figure and the opposite direction of the second direction W2 in the figure, that is, from the first sensing electrode 131A to the third sensing electrode 133A; the average current in the second magnetic field sensing element 1B flows in the middle direction between the opposite direction of the first direction W1 in the figure and the opposite direction of the second direction W2 in the figure, that is, from the eighth sensing electrode 134B to the sixth sensing electrode 132B. The average current in the third magnetic field sensing element 1C flows in the middle direction between the opposite direction of the first direction W1 in the figure and the second direction W2 in the figure, that is, from the eleventh sensing electrode 133C to the ninth sensing electrode 131C; the average current in the fourth magnetic field sensing element ID flows in the middle direction between the first direction W1 in the figure and the second direction W2 in the figure, that is, from the fourteenth sensing electrode 132D to the sixteenth sensing electrode 134D. Based on this, in the first action state, the three connecting point 73 is coupled to the current source 3, and the first connecting point 71 is coupled to the ground level, in the second action state, the second connecting point 72 is coupled to the current source 3, and the fourth connecting point 74 is coupled to the ground level, in the second action state, the fourth connecting point 74 is coupled to the current source 3, and the second connecting point 72 is coupled to the ground level, etc., these situations can be deduced, and details are not described again herein.

Figure 10:
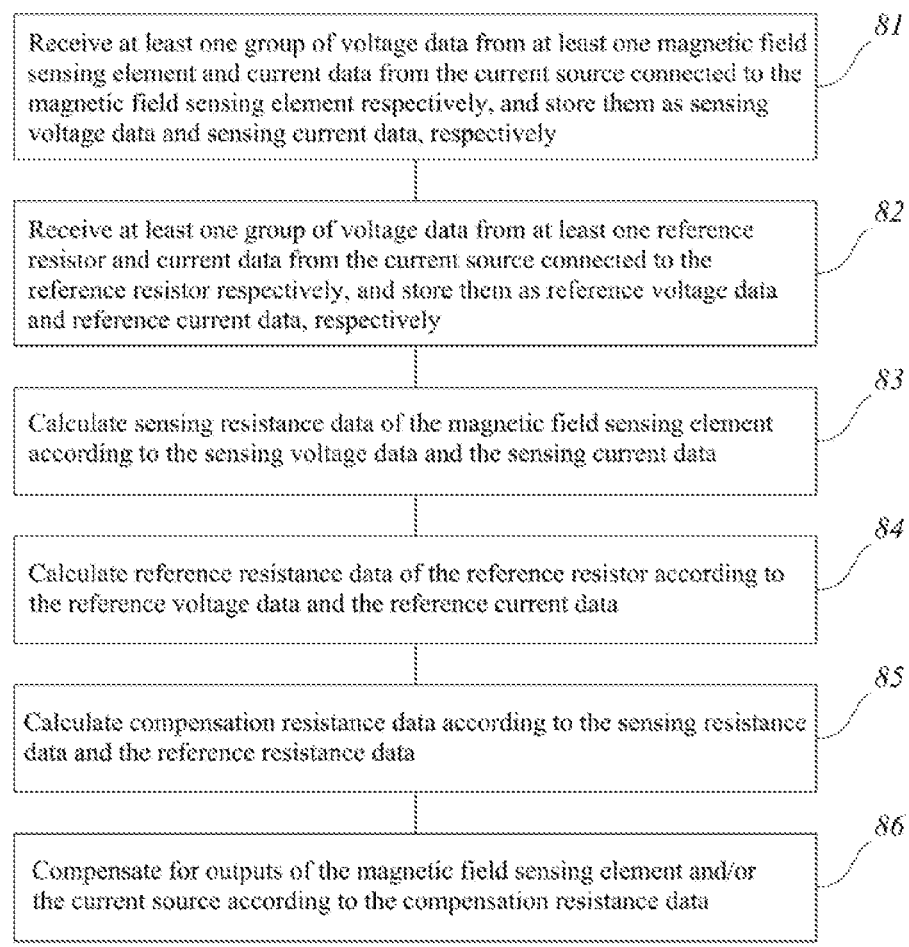
FIG. 10 is a schematic diagram of steps of a compensation method for a magnetic field sensing element according to an embodiment of the present invention.

In order to match the foregoing compensation circuit for a magnetic field sensing element, an embodiment of the present invention further provides a compensation method for a magnetic field sensing element. The compensation method for a magnetic field sensing element of the present invention can be implemented within a magnetic field sensing element compensation circuit provided by any of the aforementioned technical solutions. In one example, the magnetic field sensing element compensation method described below is executed by a processing module within the magnetic field sensing element compensation circuit. As shown in FIG. 10, the method specifically comprises the following steps.

Step 81, receive at least one group of voltage data from at least one magnetic field sensing element 1 and current data from the current source 3 coupled to the magnetic field sensing element 1 respectively, and store them as sensing voltage data and sensing current data, respectively.

Step 82, receive at least one group of voltage data from at least one reference resistor 2 and current data from the current source 3 coupled to the reference resistor 2 respectively, and store them as reference voltage data and reference current data, respectively.

Step 83, calculate sensing resistance data of the magnetic field sensing element according to the sensing voltage data and the sensing current data.

Step 84, calculate reference resistance data of the reference resistor according to the reference voltage data and the reference current data.

Step 85, calculate compensation resistance data according to the sensing resistance data and the reference resistance data.

Step 86, compensate for outputs of the magnetic field sensing element 1 and/or the current source 3 according to the compensation resistance data.

The compensation method and a specific action process may be deduced from the compensation circuit for a magnetic field sensing element provided above. The sensing resistance data is calculated from the sensing voltage data and the sensing current data according to the Ohm's law. The reference resistance data is calculated from the reference voltage data and the reference current data according to the Ohm's law. Details are not described again herein. It needs to be emphasized that the sequence of the foregoing steps does not affect the achievement of the expected technical effect, as long as it is satisfied that step 83 is performed after step 81, step 84 is performed after step 82, and step 85 and step 86 are performed after step 83 and step 84. Any other technical solution that is generated in this way will fall within the protection scope of the present invention.

Figure 11:
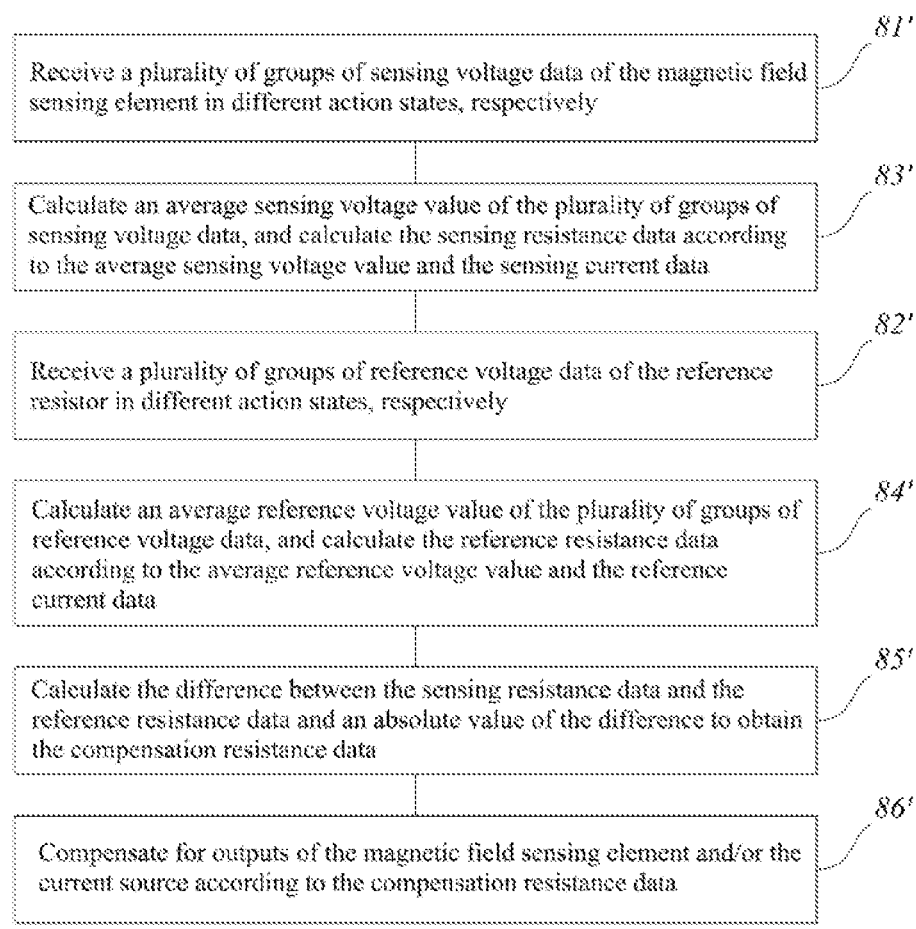
FIG. 11 is a schematic diagram of steps of a compensation method for a magnetic field sensing element according to another embodiment of the present invention.

In still another embodiment of the present invention, for a working condition in which an average value is calculated for different average current directions to eliminate the impact of field effect, a specific technical solution is provided, and as shown in FIG. 11, specifically comprises the following steps.

Step 81', receive a plurality of groups of sensing voltage data of the magnetic field sensing element 1 in different action states, respectively.

Step 83', calculate an average sensing voltage value of the plurality of groups of sensing voltage data, and calculate the sensing resistance data according to the average sensing voltage value and the sensing current data.

Step 82', receive a plurality of groups of reference voltage data of the reference resistor in different action states, respectively.

Step 84', calculate an average reference voltage value of the plurality of groups of reference voltage data, and calculate the reference resistance data according to the average reference voltage value and the reference current data.

Step 85', calculate the difference between the sensing resistance data and the reference resistance data and an absolute value of the difference to obtain the compensation resistance data.

Step 86', compensate for outputs of the magnetic field sensing element 1 and/or the current source 3 according to the compensation resistance data.

It may be understood that similar to the previous embodiment, the positions of step 81' and step 83' only need to be respectively kept before step 82' and step 84', and the positions of step 85' and step 86' only need to be sequentially kept after step 83' and step 84'.

The object of "calculate the difference" is that: the average current in the magnetic field sensing element 1 flows in a direction in a first plane, and the average current in the reference resistor 2 at least partially flows in a direction perpendicular to the first plane: therefore, when mechanical stress is applied to the first plane, a deviation greater than 0 is generated in the sensing resistance data, and a deviation less than 0 is generated in the reference resistance data; the deviation in the sensing resistance data has integrated a temperature deviation and a mechanical stress deviation of the magnetic field sensing element 1; the deviation in the reference resistance data has integrated a temperature deviation and a mechanical stress deviation of the reference resistor 2; the two temperature deviations have the same direction, and the mechanical stress deviations have opposite directions; therefore, after a difference is calculated and an absolute value of the difference is calculated, the temperature deviation is eliminated, while the mechanical stress deviation is approximately doubled. Further, the approximately doubled mechanical stress deviation may be directly used as the compensation resistance data, or the compensation resistance data is obtained after a certain ratio operation. Then the magnitude of the outputted current of the current source 3 is adjusted or an output of the post-processing circuit 6 or the processing module 4 is adjusted so as to achieve the compensation effect.

In addition, the sequence of steps in various embodiments and examples corresponding to the compensation method for a magnetic field sensing element provided by the present invention may be adjusted according to the requirements of a person skilled in the art without affecting the technical effect. In addition, it needs to be noted that the plurality of compensation methods for a magnetic field sensing element provided by the present invention cannot be separately considered. The steps in each embodiment or example can certainly be combined and/or replaced, and a new embodiment generated in this way shall fall within the protection scope of the present invention.

In the compensation circuit for a magnetic field sensing element provided in the present invention, the reference resistor 2 independent of the magnetic field sensing element 1 is disposed, and the current direction inside the reference resistor 2 is always perpendicular to the current direction inside the magnetic field sensing element 1. In this way, the sensitivity to stress can be significantly improved, and different responses of currents in different directions to stress can be used for subsequent compensation operations. In addition, the reference resistor 2 and the magnetic field sensing element 1 are configured with the same doped structure, so that the consistency of temperature can be greatly improved.

It should be understood that although the specification is described based on the embodiments, not every embodiment includes only one independent technical solution. This statement of the specification is only for clarity. Those skilled in the art should treat the specification as a whole, and technical solutions in the embodiments may also be properly combined to form other embodiments that will be understood by those skilled in the art.

The above detailed description only aims to specifically illustrate the available embodiments of the present invention, and is not intended to limit the protection scope of the present invention. Equivalent embodiments or modifications made without departing from the spirit of the present invention shall fall within the protection scope of the present invention.

What is claimed is:

1. A compensation circuit for a magnetic field sensing element, comprising:
   at least one magnetic field sensing element, each magnetic field sensing element comprising a sensing substrate, a sensing response layer, at least two sensing electrodes, and at least two sensing doped regions;
   at least one reference resistor, each reference resistor comprising a resistor substrate, a resistor response layer, at least two resistor electrodes, and at least two resistor doped regions;
   at least one current source, coupled to the magnetic field sensing element and the reference resistor; and
   a processor, coupled to electrodes of the magnetic field sensing element and the reference resistor for coupling to the current source, and configured to receive a voltage of the magnetic field sensing element and a voltage of the reference resistor, correspondingly calculate resistance values of the magnetic field sensing element and the reference resistor, and adjust an input and/or output of the magnetic field sensing element, wherein
   the sensing response layer and the sensing doped regions form a same doped structure as the resistor response layer and the resistor doped regions, an average current of the magnetic field sensing element is configured to flow in a first plane, the resistor response layer has a first thickness and a first length, the first thickness and the first length satisfy a preset multiple relationship to make an average current in the reference resistor at least partially flow in a direction of the first thickness, and the direction of the first thickness is perpendicular to the first plane.

2. The compensation circuit for a magnetic field sensing element according to claim 1, wherein the compensation circuit for a magnetic field sensing element further comprises a first switch module disposed between the current source and the magnetic field sensing element and configured to switch a connection relationship between different sensing electrodes of the magnetic field sensing element and the current source, and the processor is configured to correspondingly receive different voltages from the sensing electrode in different connection relationships, and calculate the resistance value of the magnetic field sensing element according to an average value of the different voltages.

3. The compensation circuit for a magnetic field sensing element according to claim 1, wherein the compensation circuit for a magnetic field sensing element further comprises a first switch module and a second switch module, wherein the second switch module is disposed between the current source and the reference resistor and configured to switch the connection relationship between different resistor electrodes of the reference resistor and the current source, and the processing module is configured to correspondingly receive different voltage of the resistor electrode in different connection relationships, and calculate the resistance value of the reference resistor according to an average value of the different voltages.

4. The compensation circuit for a magnetic field sensing element according to claim 1, wherein the preset multiple relationship is configured such that the first length is less than six times the first thickness.

5. The compensation circuit for a magnetic field sensing element according to claim 1, wherein the resistor response layer is disposed close to a first surface of the resistor substrate, the resistor response layer is a low-concentration N-type doped layer and/or epitaxial layer disposed on the resistor substrate, the resistor doped regions are disposed on a side in the resistor response layer close to the first surface, the resistor doped regions are high-concentration N-type doped regions, the resistor electrodes are disposed on a side of the resistor doped regions away from the resistor response layer, and the resistor electrodes, the resistor doped regions, and the resistor response layer are electrically coupled in sequence.

6. The compensation circuit for a magnetic field sensing element according to claim 5, wherein the reference resistor further comprises a resistor isolation layer and an isolation doped region disposed in the resistor isolation layer; the resistor isolation layer is disposed close to the first surface, the resistor isolation layer is a medium-concentration P-type doped layer and/or an oxide insulation layer disposed in the resistor response layer, the isolation doped region is disposed on a side of the resistor isolation layer close to the first surface, and the isolation doped region is a high-concentration P-type doped region; and the resistor isolation layer is disposed between the at least two resistor doped regions, and is configured with a volume less than that of the resistor response layer, the resistor isolation layer and the resistor response layer form a current channel for conducting a current, and the current channel at least partially extends in the direction of the first thickness.

7. The compensation circuit for a magnetic field sensing element according to claim 5, wherein the reference resistor comprises a first resistor electrode, a second resistor electrode, a first resistor doped region, a second resistor doped region, a third resistor doped region, a first resistor response layer, and a second resistor response layer, the third resistor doped region is a high-concentration N-type doped region formed on the resistor substrate, and is coupled to the first resistor response layer and the second resistor response layer, the first resistor electrode, the first resistor doped region, and the first resistor response layer are disposed on one side of the third resistor doped region, and the second resistor electrode, the second resistor doped region, and the second resistor response layer are disposed on the other side of the third resistor doped region; and an extension length of the third resistor doped region in the direction of the first thickness is less than extension lengths of the first resistor response layer and the second resistor response layer in the direction of the first thickness.

8. The compensation circuit for a magnetic field sensing element according to claim 7, wherein the reference resistor further comprises a first resistor isolation layer, a second resistor isolation layer, a first isolation doped region, and a second isolation doped region, the first resistor isolation layer and the second resistor isolation layer are respectively disposed close to the first surface, the first resistor isolation layer is a medium-concentration P-type doped layer and/or an oxide insulation layer disposed in the first resistor response layer, the second resistor isolation layer is a medium-concentration P-type doped layer and/or an oxide insulation layer disposed in the second resistor response layer, the first isolation doped region and the second isolation doped region are respectively disposed on sides of the first resistor isolation layer and the second resistor isolation layer close to the first surface, and the first isolation doped region and the second isolation doped region are both high-concentration P-type doped regions;

the first resistor isolation layer is disposed between the first resistor doped region and the third resistor doped region, and is configured with a volume less than that of the first resistor response layer, the first resistor isolation layer and the resistor response layer form a first current channel for conducting a current, and the first current channel at least partially extends in the direction of the first thickness; and the second resistor isolation layer is disposed between the third resistor doped region and the second resistor doped region, and is configured with a volume less than that of the second resistor response layer, the second resistor isolation layer and the resistor response layer form a second current channel for conducting a current, and the second current channel at least partially extends in the direction of the first thickness.

9. The compensation circuit for a magnetic field sensing element according to claim 1, wherein the compensation circuit for a magnetic field sensing element comprises a first reference resistor and a second reference resistor that respectively extend in a first direction and a second direction and are configured to be electrically coupled to each other, the first direction and the second direction are arranged at an angle, average currents in the first reference resistor and the second reference resistor at least partially flow in the first direction and the second direction respectively, and the first direction and the second direction are arranged at angles to a direction of the average current of the magnetic field sensing element.

10. The compensation circuit for a magnetic field sensing element according to claim 9, wherein the first reference resistor and the second reference resistor are connected through the resistor doped regions and/or the resistor electrodes, and an angle between the first direction and the second direction is 90 degrees.

11. The compensation circuit for a magnetic field sensing element according to claim 10, wherein the magnetic field sensing element is configured to be a square, and the first reference resistor and the second reference resistor are respectively disposed on outer sides of two lateral sides of the magnetic field sensing element.

12. The compensation circuit for a magnetic field sensing element according to claim 1, wherein the compensation circuit for a magnetic field sensing element comprises a first magnetic field sensing element and a second magnetic field sensing element, the first magnetic field sensing element comprises a first sensing electrode, a second sensing electrode, a third sensing electrode, and a fourth sensing electrode, and the second magnetic field sensing element comprises a fifth sensing electrode, a sixth sensing electrode, a seventh sensing electrode, and an eighth sensing electrode;

the first sensing electrode and the sixth sensing electrode are connected and form a first connecting point, the second sensing electrode and the seventh sensing electrode are connected and form a second connecting point, the fourth sensing electrode and the fifth sensing electrode are connected and form a third connecting point, and the third sensing electrode and the eighth sensing electrode are connected and form a fourth connecting point; and the first magnetic field sensing element and the second magnetic field sensing element are configured with a first action state and a second action state: in the first action state, one of the first connecting point and the fourth connecting point is coupled to the current source, and the other is coupled to a ground level; and in the second action state, one of the second connecting point and the third connecting point is coupled to the current source, and the other is coupled to the ground level.

13. The compensation circuit for a magnetic field sensing element according to claim 1, wherein the compensation circuit for a magnetic field sensing element comprises a first magnetic field sensing element, a second magnetic field sensing element, a third magnetic field sensing element, and a fourth magnetic field sensing element, the first magnetic field sensing element comprises a first sensing electrode, a second sensing electrode, a third sensing electrode, and a fourth sensing electrode, the second magnetic field sensing element comprises a fifth sensing electrode, a sixth sensing electrode, a seventh sensing electrode, and an eighth sensing electrode, the third magnetic field sensing element comprises a ninth sensing electrode, a tenth sensing electrode, an eleventh sensing electrode, and a twelfth sensing electrode, and the fourth magnetic field sensing element comprises a thirteenth sensing electrode, a fourteenth sensing electrode, a fifteenth sensing electrode, and a sixteenth sensing electrode;

the first sensing electrode, the eighth sensing electrode, the eleventh sensing electrode, and the fourteenth sensing electrode are connected and form a first connecting point, the second sensing electrode, the fifth sensing electrode, the twelfth sensing electrode, and the fifteenth sensing electrode are connected and form a second connecting point, the third sensing electrode, the sixth sensing electrode, the ninth sensing electrode, and the sixteenth sensing electrode are connected and form a third connecting point, and the fourth sensing electrode, the seventh sensing electrode, the tenth sensing electrode, and the thirteenth sensing electrode are connected and form a fourth connecting point;

the first magnetic field sensing element, the second magnetic field sensing element, the third magnetic field sensing element, and the fourth magnetic field sensing element are configured with a first action state and a second action state: in the first action state, one of the first connecting point and the third connecting point is coupled to the current source, and the other is coupled to a ground level; and in the second action state, one of the second connecting point and the fourth connecting point is coupled to the current source, and the other is coupled to the ground level.

14. A compensation method for a magnetic field sensing element, implemented in the compensation circuit for a magnetic field sensing element according to claim 1, comprising:

respectively receiving at least one group of voltage data from at least one magnetic field sensing element and current data from a current source coupled to the magnetic field sensing element, and respectively storing them as sensing voltage data and sensing current data;

respectively receiving at least one group of voltage data from at least one reference resistor and current data from a current source coupled to the reference resistor, and respectively storing them as reference voltage data and reference current data;

calculating sensing resistance data of the magnetic field sensing element according to the sensing voltage data and the sensing current data;

calculating reference resistance data of the reference resistor according to the reference voltage data and the reference current data;

calculating compensation resistance data according to the sensing resistance data and the reference resistance data; and compensating for outputs of the magnetic field sensing element and/or the current source according to the compensation resistance data.

15. The compensation method for a magnetic field sensing element according to claim 14, wherein the method specifically comprises:

respectively receiving a plurality of groups of the sensing voltage data of the magnetic field sensing element in different action states;

calculating an average sensing voltage value of the plurality of groups of the sensing voltage data, and calculating the sensing resistance data according to the average sensing voltage value and the sensing current data;

respectively receiving a plurality of groups of the reference voltage data of the reference resistor in different action states;

calculating an average reference voltage value of the plurality of groups of the reference voltage data, and calculating the reference resistance data according to the average reference voltage value and the reference current data; and calculating a difference between the sensing resistance data and the reference resistance data, and calculating an absolute value of the difference to obtain the compensation resistance data.

* * * * *